US010035942B2

(12) United States Patent
Biddle et al.

(10) Patent No.: US 10,035,942 B2
(45) Date of Patent: Jul. 31, 2018

(54) COMPOSITIONS AND METHODS FOR FIBER-CONTAINING GROUT

(71) Applicants: FORTA CORPORATION, Grove City, PA (US); Jennie R. Lovett, Harrisville, PA (US)

(72) Inventors: Daniel T. Biddle, Grove City, PA (US); Jeffrey B Lovett, Harrisville, PA (US); Keith Davis, Stephenville, TX (US)

(73) Assignee: FORTA CORPORATION, Grove City, PA (US)

( * ) Notice: Subject to any disclaimer, the term of this patent is extended or adjusted under 35 U.S.C. 154(b) by 0 days.

(21) Appl. No.: 15/885,880

(22) Filed: Feb. 1, 2018

(65) Prior Publication Data

US 2018/0155603 A1 Jun. 7, 2018

Related U.S. Application Data

(62) Division of application No. 14/850,453, filed on Sep. 10, 2015, now Pat. No. 9,909,048.

(60) Provisional application No. 62/048,312, filed on Sep. 10, 2014.

(51) Int. Cl.
| | |
|---|---|
| *C09K 8/16* | (2006.01) |
| *C04B 28/02* | (2006.01) |
| *C09K 8/48* | (2006.01) |
| *C09K 8/516* | (2006.01) |
| *C04B 111/70* | (2006.01) |

(52) U.S. Cl.
CPC ............... *C09K 8/16* (2013.01); *C04B 28/02* (2013.01); *C09K 8/48* (2013.01); *C09K 8/516* (2013.01); *C04B 2111/70* (2013.01); *C09K 2208/08* (2013.01); *Y02W 30/97* (2015.05)

(58) Field of Classification Search
CPC ................................... C09K 8/16; C09K 8/48
USPC ........................................................ 166/292
See application file for complete search history.

(56) References Cited

U.S. PATENT DOCUMENTS

| | | |
|---|---|---|
| 3,985,934 A | 10/1976 | Farrissey, Jr. et al. |
| 5,298,071 A | 3/1994 | Vondran |
| 5,399,195 A | 3/1995 | Hansen et al. |
| 5,456,752 A | 10/1995 | Hogan |
| 5,628,822 A | 5/1997 | Hogan |
| 6,235,108 B1 | 5/2001 | Lambrechts |
| 6,753,081 B1 | 6/2004 | Lovett et al. |

(Continued)

FOREIGN PATENT DOCUMENTS

| | | |
|---|---|---|
| JP | 51119826 A | 10/1976 |
| JP | 2011144103 A | 7/2011 |

(Continued)

OTHER PUBLICATIONS

Extended European Search Report, 15840519.1-1106/3191301 PCT/US2015049363, dated Sep. 5, 2018, 10 Pages.

*Primary Examiner* — Angela M DiTrani
*Assistant Examiner* — Ashish K Varma
(74) *Attorney, Agent, or Firm* — Eckert Seamans Cherin & Mellott, LLC; Carol A. Marmo

(57) ABSTRACT

The invention relates to cementitious or grout compositions and drilling fluids including reinforcement fibers and methods relating thereto. The cementitious or grout compositions include dry blend material and reinforcement fibers. Each of the fibers can have one or more of a pre-selected mean length, denier, diameter and aspect ratio to improve dispersion in dry blending the cementitious or grout compositions.

4 Claims, 1 Drawing Sheet

(56) References Cited

U.S. PATENT DOCUMENTS

| | | |
|---|---|---|
| 7,025,825 B2 | 4/2006 | Pyzik et al. |
| 7,168,232 B2 | 1/2007 | Lovett et al. |
| 7,493,968 B2 | 2/2009 | Reddy et al. |
| 7,537,054 B2 | 5/2009 | Reddy et al. |
| 2014/0054039 A1 | 2/2014 | Chang et al. |
| 2014/0364535 A1 | 12/2014 | Chatterji et al. |

FOREIGN PATENT DOCUMENTS

| | | |
|---|---|---|
| WO | 95/11861 A1 | 10/1976 |
| WO | 03/014040 A1 | 2/2003 |
| WO | 2006100506 A2 | 9/2006 |
| WO | 2009158340 A2 | 12/2009 |

COMPOSITIONS AND METHODS FOR FIBER-CONTAINING GROUT

CROSS REFERENCE TO RELATED PATENT APPLICATION

This divisional patent application claims the benefit of U.S. patent application Ser. No. 14/850,453, filed Sep. 10, 2015, which claims the benefit of U.S. Provisional Patent Application No. 62/048,312, entitled "Compositions and Methods for Fiber-Containing Grout", filed on Sep. 10, 2014, the contents of which are incorporated herein by reference.

FIELD OF THE INVENTION

The present invention relates to reinforcement fibers, cementitious or grout compositions and drilling fluids incorporating the reinforcement fibers, and methods of preparation. More particularly, the present invention relates to reinforcement fibers for incorporation and dispersion into dry blend cementitious or grout compositions.

BACKGROUND OF THE INVENTION

Various reinforcement fibers and their use in a wide variety of applications are known in the art. For example, it is known to add reinforcement fibers to materials, such as concrete, including asphalt cement concrete and Portland cement concrete and the like, to add strength, toughness, and durability, and to improve the integrity of the cement properties. Typical reinforcement fibers that are added to concrete include, for example, asbestos fibers, glass fibers, steel fibers, mineral fibers, natural fibers, synthetic fibers (such as polymer and aramid fibers), and cellulose fibers. Some reinforcement fibers are better suited for particular applications than others. For example, asbestos fibers are known to provide effective reinforcement but, due to environmental and health concerns, these fibers are not extensively used. In addition, some fibers are relatively expensive and as a result, their commercial use is limited.

Reinforcement fibers are also generally known for use in the drilling industry. Oil, gas and other subterranean wells are made by drilling a borehole into the ground. A rotating drill is typically used to form the borehole. As the rotating drill works its way through geological formations, debris from the cuttings, such as, rock, dirt and clay, accumulates and fills the hole. A liquid, such as, fresh water, salt water or a water and oil mixture, is circulated downwardly through a drill pipe and drill bit and then upwardly through an annulus created between the drill pipe and the wall of the borehole. Circulation of the liquid is effective to carry debris out of the borehole, and simultaneously to cool and lubricate the drill. However, the liquid alone is typically not effective to remove a sufficient amount of debris and other mechanisms are employed to enhance debris removal. For example, to improve the level of debris removal, additives are injected within the liquid through the drill pipe into the well bore. It is known in the art to use reinforcement fibers as an additive to drilling liquids to increase the levels of debris removal. The addition of reinforcement fibers to drilling liquids increases the carrying capacity without increasing the viscosity of the liquid.

In addition to their role as an additive for debris removal, reinforcement fibers also may be added to drilling liquids/fluids as a lost circulation material. Lost circulation generally refers to the undesirable loss of at least a portion of drilling fluid into the subterranean formation penetrated by the well bore. Thus, the addition of reinforcement fibers is effective to prevent fluid loss through fissures and pores in the geological formations.

In addition to, or instead of, adding reinforcement fibers to the drilling liquid/fluid, the fibers can be incorporated as a lost circulation material into the cement which is used in drilling wells. In drilling a well, a pipe string (e.g., casing and/or liner) may be run into a well bore and cemented in place. A cement composition is pumped into an annulus between the walls of the wellbore and the exterior surface of the pipe string disposed therein. The cement composition sets in the annular space, thereby forming an annular sheath of hardened, substantially impermeable cement that supports and positions the pipe string in the wellbore and bonds the pipe string surface to the subterranean formation. The annular sheath of set cement surrounding the pipe string functions to prevent the migration of fluids in the annulus. The presence of reinforcement fibers in the cement can reduce or preclude voids or cracks in the cement and therefore, reduce or preclude the flow of liquids there through.

It has been found in accordance with the present invention that reinforcement fibers provide benefits to known cementitious compositions. Typically, such compositions consist of water, cement, sand and optionally color or pigment, which can be mixed wet into thick emulsions which harden over time. There are a wide variety of cementitious compositions and uses for these materials. For example, cementitious compositions include, but are not limited to, grout compositions. There are varied uses for grout known in the art, such as, to embed rebars in masonry walls, connect sections of precast concrete, and fill voids and seal joints, such as between tiles. Structural grout is often used in reinforced masonry to fill voids in masonry housing reinforcing steel, securing the steel in place and bonding it to the masonry. Non-shrink grout is used beneath metal bearing plates to ensure a consistent bearing surface between the plate and its substrate.

In certain embodiments, grout compositions are used to anchor bolts for various structures into a variety of substrates. For example, grout is used to anchor power line tower support bolts and guy wires to the earth. In certain other embodiments, grout compositions are used in micropiles in the earth that consist of holes in the range of from 15 to 80 feet in depth. The hardened piles then serve as support connections for electrical transmission line structures. In these embodiments, the grout composition is often in the form of a liquid. The liquid grout is used to fill hollow cavities or holes. With known grout compositions, leakage through porous and fractured rock within the earthen substrate has occurred. As a result, a significant portion of the grout used to fill the cavities can be lost. Since considerably more grout needs to be used than estimated, the cost associated with the grout leakage and losses can be significant. Thus, there is a need in the art to improve grout compositions such that they remain flowable during insertion and placement, and then thicken in order to reduce or preclude losses due to leakage into undesired zones. In general, it is desirable to form a grout composition that is thixotropic in nature such that the grout flows readily when in a liquid form, is transformed to a gel when static and subsequently returns to a liquid when forced to move. Further, it is advantageous for the grout composition to plug-off cavities to prevent leakage there through.

It is known in the art to use polyolefin fibers as lost circulation material because they are readily available. However, polyolefin fibers tend to be difficult to dry blend with cement. Further, it has been found that polyolefin fibers agglomerate in dry cement when it is conveyed causing plugging to occur, and when the cement and fibers are combined with mixing water, the fibers can have a tendency to clump which can prevent their dispersion into and throughout the cement composition. The lack of dispersion of the fibers in the cement composition can make it difficult to pump. In an attempt to improve dry blending, various compositions and methods have been developed for surface treating the hydrophobic fibers to render them hydrophilic.

There is a need to develop improved or enhanced fibers as lost circulation material that can easily disperse in cementitious or grout compositions and drilling fluids, and are suitable for dry blending in commercial applications, whether treated or untreated.

SUMMARY OF THE INVENTION

In one aspect, the present invention provides a dry blend grout composition including dry grout material and reinforcement fiber having a mean length from about 0.125 inch to about 0.375 inch.

In certain embodiments, the mean length of the reinforcement fiber is from about 0.125 to about 0.25 inch.

The reinforcement fiber can have a mean diameter from about 0.001 inch to about 0.15 inch or from about 0.025 inch to about 0.085 inch.

The reinforcement fiber can have a mean denier from about 100 to about 20,000 per filament or from about 2,500 to about 10,000 per filament.

The reinforcement fiber can have a flat, rectangular shape. Further, the reinforcement fiber can include one or more of the following characteristics: serrated, embossed, crimped and fibrillated. Wherein the reinforcement fiber is serrated, it can be have a plurality of serrations extending longitudinally along a length of one or both of top and bottom surfaces of the fiber.

The reinforcement fiber can be selected from polyolefin, aramid and mixtures thereof.

In certain embodiments, the dry grout material can be selected from cement, bentonite clay and mixtures thereof.

In another aspect, the invention provides a method of preparing a dry blend grout composition. The method includes combining dry grout material and reinforcement fiber having a mean length from about 0.125 inch to about 0.375 inch to form a fiber-containing grout dry blend.

The method can further include one or more of the following steps: storing the fiber-containing grout dry blend in a package, releasing the fiber-containing grout dry blend from the package, and mixing the fiber-containing grout dry blend with water to form a flowable liquid material.

In another aspect, the invention provides a method of grouting in a well bore. The method includes providing a dry grout composition including dry grout material and reinforcement fiber having a mean length from about 0.125 inch to about 0.375 inch; mixing the dry grout composition with water to form a blended grout composition; placing the blended grout composition in a well bore, wherein the reinforcement fiber reduces loss of fluid circulation of the blended grout composition and subsequently introduced fluids; and allowing the blended grout composition to set in the well bore.

In yet another aspect, the invention provides a composition for reducing loss of drilling fluid circulation in a well bore. The composition includes drilling fluid and reinforcement fiber having a mean length from about 0.125 inch to about 0.375 inch.

In still another aspect, the invention provides a method of reducing loss of drilling fluid circulation in a well bore. The method includes drilling a borehole into a geological formation and introducing into the borehole a drilling fluid and reinforcement fiber having a mean length from about 0.125 inch to about 0.375 inch.

BRIEF DESCRIPTION OF THE DRAWINGS

A further understanding of the invention can be gained from the following description of the preferred embodiments when read in conjunction with the accompanying drawings in which.

DETAILED DESCRIPTION OF THE INVENTION

Figure 1:
FIG. 1 is a top view of a reinforcement fiber having a flat, rectangular, tape-like form, in accordance with certain embodiments of the invention.

The present invention relates to cementing or grouting operations and, more particularly, to methods and cement or grout compositions that utilize reinforcement fibers for lost circulation and/or mechanical property enhancement. One of the various potential advantages of the embodiments of the invention is that the fibers have been developed, fabricated, shaped and sized to enhance their dry blending capabilities. Because embodiments of the fibers can be easily dry blended with hydraulic cement or grout, and subsequently dispersed in the cement or grout composition, they can improve the efficiency and ease of operation for field operations and field placement of the cement or grout. In contrast, other reinforcement fibers typically need to be added to the mix water due to problems associated with their dry blending.

In general, the present invention is directed to a synthetic fiber reinforcement component for incorporation into cementitious materials. As used herein, "cementitious" materials and compositions include, but are not limited to, cement, concrete, shotcrete, mortar, grout, asphalt, and the like.

For ease of description, this detailed description discloses specific forms as examples of the invention. Those having ordinary skill in the relevant art will be able to adapt the invention to application in other forms not specifically presented herein based upon the present description. For example, wherein the term "cement" is recited herein, said term can be replaced with "grout" or the other cementitious materials described herein, or vice versa.

In the present invention, the reinforcement fibers also can be used to reduce the loss of circulation fluid that is known to occur during drilling operations, e.g., drilling of a well bore. The reinforcement fibers in accordance with the invention (as described herein in more detail) are combined with the drilling fluid and are effective to reduce the loss of at least a portion of drilling fluid into the subterranean formation penetrated by the well bore. Thus, the addition of reinforcement fibers is effective to prevent fluid loss through fissures and pores in the geological formations. The drilling fluid and reinforcement fibers can be introduced into a borehole separately, e.g., individually. The order of introduction is not critical. Alternately, the drilling fluid and reinforcement fibers can be introduced into the borehole simultaneously. For example, the fluid and fibers can be combined together and then introduced into the borehole. It is also contemplated that other materials that are known for use as additives to drilling fluids may be optionally included.

In certain embodiments, the present invention relates to grout compositions containing reinforcement fibers, methods of preparing these compositions and uses therefor. A wide variety of grout compositions are known in the art and typically include the combination of water and dry grout material, such as, but not limited to, cement, clay, e.g., bentonite, and mixtures thereof. Other optional additives may also be present in the compositions. Typically, grout compositions are in the form of a dry blend. Water is added to the composition (e.g., on-site at the time of grout placement) to form a liquid mixture or blend.

In general, the reinforcement fibers can be composed of any material that provides for suspension of the reinforcement fibers in the liquid grout composition. The length of the fibers can vary. In certain embodiments, wherein the fibers are added at the time that the dry grout composition is combined with water, it has been found that the length of the fiber is not necessarily critical. That is, when combining fibers, dry grout composition and water to form a liquid grout material, the fibers can have a mean length of up to about 0.5 inch. However, when pre-blending the fibers, the length of the fibers can be pre-selected to improve or enhance mixing and dispersion of the individual fibers throughout the grout composition. As used herein "pre-blended" refers to combining the reinforcement fibers with the dry grout composition prior to packaging (and prior to the addition of water). Thus, pre-blended dry grout composition includes the dry grout material, e.g., ingredients, and the reinforcement fibers, e.g., in a sack or bag. Non-pre-blended dry grout composition includes only the dry grout material/ingredients, e.g., in a sack or bag, in the absence of reinforcement fibers, and the fibers are subsequently added when the dry grout package is opened and combined with water, e.g., on-site. In the pre-blended embodiments, wherein the fibers are mixed with the dry grout composition, packaged and then the contents of the package combined with water (e.g., on-site at the time of grout placement), it has been found that there are one or more advantages, such as mixing and dispersion, associated with using fibers that have a generally short length.

In accordance with the invention, reinforcement fibers are added to known grout compositions. Generally, reinforcement fibers include multiple strands of monofilaments. The reinforcement fibers can be bundled or not bundled together. A bundle of fibers can include from about 50 to about 5000 filaments/monofilaments. The reinforcement fibers can be selected from the group consisting of synthetic fibers, natural fibers, and mixtures thereof. Non-limiting examples of synthetic fibers include polymer fibers, aramid fibers, polyester fibers, nylon fibers and mixtures thereof. The polymer fibers can include polyolefin fibers, polyamide fibers, polyvinyl-chloride fibers, and mixtures thereof. The polyolefin fibers can be selected from the group of polypropylene fibers, polyethylene fibers, and mixtures thereof. In certain embodiments, the reinforcement fibers include hydrophilic fibers selected from the group consisting of polyolefins, polyester, nylon, and mixtures thereof. The reinforcement fibers can include one or more of polypropylene fibers, polyethylene fibers, and other polyolefin fibers. For example, a bundle of fibers can include a combination of polypropylene fibers and polyethylene fibers, or bundle(s) of polypropylene fibers can be combined with bundle(s) of polyethylene fibers. Polyolefin fibers that may be particularly useful in certain embodiments are commercially available from Forta Corporation, Grove City, Pa.

In general, reinforcement fibers are of various shapes, forms and sizes. The reinforcement fibers can be treated or untreated, fibrillated or non-fibrillated, twisted or non-twisted, and crimped or non-crimped. It has been found in the present invention that fibers that are flat and have a rectangular shape are particularly suitable for dry blending in grout compositions. The flat, rectangular fibers can be in the form, for example, of a strip or tape, as compared to known rod-shaped or cylindrical-shaped fibers. FIG. 1 shows a top view of a flat, rectangular, tape-like fiber 1, in accordance with certain embodiments of the invention.

Figure 2:
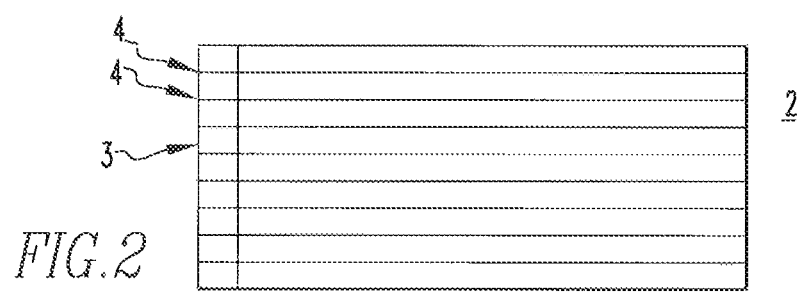
FIG. 2 is a top view of a reinforcement fiber having a flat, rectangular, tape-like, serrated form, in accordance with certain embodiments of the invention.

In certain embodiments, the flat, rectangular fibers can be serrated. The serrations, e.g., grooves, can be formed in only one or both of the top and bottom surfaces of the fibers. FIG. 2 shows a top view of a flat, rectangular, serrated fiber 2, in accordance with certain embodiments of the invention. The fiber 2 includes a side edge 3 and a plurality of serrations (e.g., grooves) 4 formed in the top surface. The serrations 4 extend longitudinally along a length of the fiber 2. The plurality of serrations 4 can vary and can be more or less than the number of serrations shown in FIG. 2. The depth of the serrations or grooves, individually or collectively, can also vary. In general, the groove depth is sufficient to allow the fiber to be folded or bent, while the groove is not too deep such that folding or bending of the fiber results in splitting of the fiber.

Figure 3:
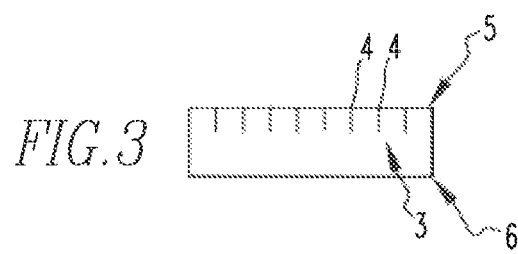
FIG. 3 is a front view of a side edge of the reinforcement fiber shown in FIG. 2, in accordance with certain embodiments of the invention.

FIG. 3 is a front view of the side edge 3, showing the fiber 2 and the plurality of serrations 4, as shown in FIG. 2. FIG. 3 also shows that the plurality of serrations 4 is only formed in a top surface 5 of the fiber 2. There are no serrations formed in a bottom surface 6 of the fiber 2.

Figure 4:
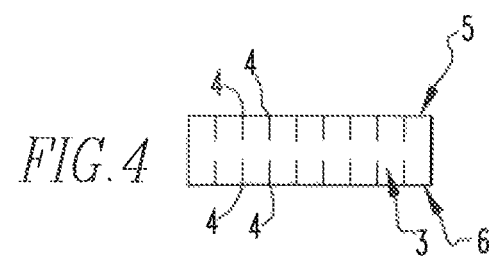
FIG. 4 is a front view of a side edge of the reinforcement fiber shown in FIG. 2, in accordance with certain embodiments of the invention.

FIG. 4 is a front view of the side edge 3, showing the fiber 2 and the plurality of serrations 4, as shown in FIGS. 2 and 3. In addition, FIG. 4 shows that the plurality of serrations 4 are formed in both the top surface 5 and the bottom surface 6 of the fiber 2.

Additionally, the rectangular fibers may be embossed. As used herein, the term "embossed" means that pressure is applied to portions of the fiber to form indentations on the surface of the fiber. Furthermore, the reinforcement fibers are sized, e.g., to a desired length, to enhance their dry blending capabilities. For example, fiber strands can be mechanically cut, so as to produce fibers having a desired length. Cutting is typically accomplished by passing bundles of fiber strands over a wheel containing radially placed knives. The fiber strands are pressed against the knives by pressure from rollers, and are thus cut to the desired length, which is equal to the distance between the knives. In certain embodiments, the reinforcement fibers have a mean length in a range from about 0.125 inch to about 0.375 inch or from about 0.125 inch to about 0.25 inch. In particular embodiments, the reinforcement fibers have a mean length of about 0.125 inch and in particular other embodiments, the reinforcement fibers have a mean length of about 0.25 inch.

The denier of the reinforcement fibers can also vary and may be selected to enhance the ability for dry blending the fibers in grout compositions. Generally, denier can depend on the material of the fibers, their configuration (e.g., monofilament, bundled, fibrillated, non-fibrillated, etc.), and their intended use (e.g., improved strength, debris removal, and lost circulation). In certain embodiments, the reinforcement fibers have a mean denier from about 100 to about 20,000. In other embodiments, the reinforcement fibers have a mean denier from about 2,500 to about 10,000.

The mean diameter of the reinforcement fibers can also vary. In certain embodiments, the mean diameter can be from about 0.0010 to about 0.15 inch, or from about 0.0015 to about 0.15 inch, or from about 0.0010 to about 0.10 inch, or from about 0.0015 to about 0.10 inch, or from about 0.025 inch to about 0.10 inch, or from about 0.025 to about 0.085 inch, or from about 0.050 inch to about 0.085 inch.

The reinforcement fibers also have an aspect ratio corresponding thereto. The aspect ratio is defined as, and calculated by, the mean length of the reinforcement fibers divided by the mean diameter of the reinforcement fibers. Thus, various combinations of mean length and mean diameter will result in different aspect ratios. For example, reinforcement fibers having a mean length of about 0.125 inch and a mean diameter from about 0.001 inch to about 0.15 inch will have an aspect ratio from about 125 to about 1, and reinforcement fibers having a mean length of about 0.375 inch and a mean diameter from about 0.001 inch to about 0.15 inch will have an aspect ratio from about 375 to 2.5.

The reinforcement fibers for use in the invention can be treated or untreated. For example, polyolefin reinforcement fibers can be dry blended into a grout composition in the presence of or in the absence of a surface treatment or coating being applied to modify the surface tension of the fiber. As previously described, it is known to surface treat or coat polyolefin fibers with a surfactant or wetting agent to modify the fiber surface and render a desired surface tension, in an attempt to facilitate dispersion of the fibers in dry blending. In accordance with the invention, reinforcement, e.g., polyolefin, fibers, with or without being pre-treated or pre-coated, are easily and thoroughly mixed and dispersed into a dry grout composition.

The reinforcement fibers are present in the grout compositions in an amount that is sufficient to provide the desired mechanical properties and/or lost circulation control. One of ordinary skill in the art, with the benefit of this disclosure, should be able to select an appropriate amount of the reinforcement (e.g., polyolefin) fibers to include for a particular application.

Certain embodiments of the invention include the addition of the reinforcement fibers with cementitious material and water. Any of a variety of hydraulic cements, clays or the like, suitable for use in subterranean cementing operations, may be used in accordance with the embodiments of the present invention. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, silica cements and combinations thereof. In certain embodiments, the hydraulic cement may comprise a Portland cement. In certain other embodiments, bentonite clay is combined with the reinforcement fibers and water.

The water used in the cement compositions can include, for example, freshwater, saltwater, brine, seawater, or any combination thereof. Generally, the water may be from any source, provided, for example, that it does not contain an excess of compounds that may undesirably affect other components in the cement compositions.

Additional additives may be included in the cement compositions as desired by those of ordinary skill in the art. For example, the cement compositions may be unfoamed or foamed with a foaming additive and a gas. Other suitable additives include dispersants, set accelerators, set retarders, lost circulation materials, fluid loss control additives, defoaming additives, thixotropic additives and combinations thereof.

The components of the grout composition may be combined in any order desired to form a grout composition that can be placed into a subterranean formation. In addition, the components of the grout compositions may be combined using any mixing device compatible with the composition, including a bulk mixer, for example. In some embodiments, the grout compositions may be prepared by combining the dry components with water. Other additives may be combined with the water before it is added to the dry components. In some embodiments, the dry components may be dry blended prior to their combination with water. For example, a dry blend may be prepared that includes the hydraulic cement and the reinforcement fibers (e.g., polyolefin) fibers. As previously described, the polyolefin fibers in accordance with the invention may be more easily dry blended with the cement than other known polyolefin fibers.

In one embodiment, the reinforcement fibers are combined, e.g., blended, with a filler material, e.g., other loss circulation materials. A wide variety of filler materials are known in the art, such as, but not limited to materials referred to as loss circulation materials. In further embodiments, the filler material is a laminate flake material, such as PhenoSeal®, which is commercially available from Forta Corporation.

Furthermore, without intending to be bound by any particular theory, it is believed that one or more of the general short mean length of the reinforcement fibers, e.g., from about 0.125 inch to about 0.375 inch or from about 0.125 inch to about 0.25 inch; the mean denier of the reinforcement fibers, e.g., from about 100 to about 20,000 per filament or from about 2,500 to about 10,000 per filament; and the mean diameter of the reinforcement fibers, e.g., from about 0.0010 to about 0.15 inch, or from about 0.0015 to about 0.15 inch, or from about 0.0010 to about 0.10 inch, or from about 0.0015 to about 0.10 inch, or from about 0.025 inch to about 0.10 inch, or from about 0.025 to about 0.085 inch, or from about 0.050 inch to about 0.085 inch, contribute to the ability of the fibers in the grout composition to remain suspended and flowing (providing adequate time for the chemicals, e.g., pozzolans, to "work") and then, to plug holes such that leakage of the grout composition through the holes is reduced or precluded (as compared to the leakage experienced with known grout compositions).

The fiber-containing grout compositions of the invention exhibit one or more of the following benefits:

(i) The reinforcement fibers mix well in both wet grout slurry mixes (non-pre-blended), and in dry-powder grout mixes (pre-blended/dry blended) where water is subsequently added during placement;

(ii) The reinforcement fibers allow slurry-liquid grout compositions to remain flowable without causing premature coagulation or clogging during injection of the compositions into voids or cavities;

(iii) In flow, the reinforcement fibers contribute to the flow of fluid into tight fissures and cracks thereby allowing the liquid grout composition to flow only where needed and thus, reducing grout leakage or loss and the expense associated therewith; and (iv) the reinforcement fibers remain suspended in the liquid grout slurry, without floating on or sinking in the liquid medium.

Suitable grout compositions for use in the invention include, but are not limited to, cement-based grouts, chemical-based grouts and mixtures or combinations thereof. Further, it is known to include an additive, such as polymer, with these grout compositions in order to achieve desired properties and characteristics. Non-limiting examples of suitable grout compositions include, but are not limited to, bentonite grout compositions which may be used in various applications such as, but not limited to, grouting horizontal heat loop bores, plugging abandon wells, grouting water wells, and for slurry walls to prevent ground water movement in permeable earth. Bentonite grout compositions, like other grout compositions, are packaged in sacks and therefore, fibers can be easily blended therewith.

In addition, as previously described herein, the reinforcement fibers in accordance with the invention (and for use in dry blending grout compositions) can be used in conjunction with drilling fluids. In these embodiments, the reinforcement fibers are effective to reduce at least a portion of drilling fluid that is typically lost in a well bore. Thus, the invention provides a composition for reducing loss of drilling fluid circulation in a well bore. The invention further includes a method of reducing a loss of drilling fluid circulation in the well bore that includes drilling a borehole into a geological formation and introducing into the borehole the drilling fluid and the reinforcement fiber of the present invention.

In accordance with the present invention, a composition and method for cementing or grouting in a well bore are also provided, which include combining cement or dry grouting material and the reinforcement fibers to form a dry blend or pre-blended cement/grout composition, combining the dry blend composition with water to form a blended or flowable cement/grout composition, placing the blended cement/grout composition in a well bore and allowing the blended cement/grout composition to set in the well bore. The reinforcement fibers are effective to reduce loss of fluid circulation of the blended cement/grout composition and any subsequently introduced fluids.

EXAMPLE

In a container, about 98 grams of dry Portland cement were mixed with about 2 grams of Ferro® fibers (commercially available and obtained from Forta Corporation in Grove City, Pa.). Based on visual observation, it was determined that the fibers were easily separated and dispersed throughout the dry cement mixture. The dry cement mixture was then poured from the container into another container and it was visually observed that the fibers remained separated and dispersed therein.

It will be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention.

We claim:

1. A method of preparing a dry blend grout composition, comprising:
   combining dry grout material and a flat, rectangular-shaped, serrated reinforcement fiber having a top surface, a bottom surface, and a mean length from about 0.125 inch to about 0.375 inch to form a fiber-containing, grout dry blend,
   wherein the reinforcement fiber has a plurality of serrations extending longitudinally along a length of one or both of the top and bottom surfaces of the fiber.

2. The method of claim 1, further comprising:
   storing the fiber-containing grout dry blend in a package.

3. The method of claim 2, further comprising:
   releasing the fiber-containing grout dry blend from the package; and
   mixing the fiber-containing grout dry blend with water to form a flowable liquid material.

4. A method of grouting in a well bore, comprising:
   providing a dry grout composition, comprising:
   dry grout material; and
   a flat, rectangular-shaped, serrated reinforcement fiber having a top surface, a bottom surface, and a mean length from about 0.125 inch to about 0.375 inch, wherein the reinforcement fiber has a plurality of serrations extending longitudinally along a length of one or both of the top and bottom surfaces of the fiber;
   mixing the dry grout composition with water to form a blended grout composition;
   placing the blended grout composition in a well bore, wherein the reinforcement fiber reduces loss of fluid circulation of the blended grout composition and/or any subsequently introduced fluids; and
   allowing the blended grout composition to set in the well bore.

* * * * *